(12) United States Patent
Wang et al.

(10) Patent No.: US 9,759,904 B2
(45) Date of Patent: Sep. 12, 2017

(54) 2D/3D SWITCHING APPARATUS AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Xiaoyi Zheng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/429,838

(22) PCT Filed: Apr. 30, 2014

(86) PCT No.: PCT/CN2014/076561
§ 371 (c)(1),
(2) Date: Mar. 20, 2015

(87) PCT Pub. No.: WO2015/096338
PCT Pub. Date: Jul. 2, 2015

(65) Prior Publication Data
US 2016/0041383 A1    Feb. 11, 2016

(30) Foreign Application Priority Data
Dec. 26, 2013   (CN) .......................... 2013 1 0731547

(51) Int. Cl.
*G02B 27/22* (2006.01)
*G02B 26/00* (2006.01)
*G02B 3/14* (2006.01)

(52) U.S. Cl.
CPC ............. *G02B 26/004* (2013.01); *G02B 3/14* (2013.01); *G02B 27/2214* (2013.01)

(58) Field of Classification Search
CPC .. G02B 27/2214; G02B 27/225; G02B 27/22; G02B 5/201; G02B 26/005;
(Continued)

(56) References Cited
U.S. PATENT DOCUMENTS

2010/0195190 A1    8/2010   Ishioka et al.
2011/0115223 A1*   5/2011   Stahlkopf .............. F01K 13/02
                                                           290/7

FOREIGN PATENT DOCUMENTS

CN            1568624 A      1/2005
CN         101303422 A      11/2008
(Continued)

OTHER PUBLICATIONS

First Office Action of Chinese application No. 201310731547.4, dated Jul. 3, 2015. Translation provided by Dragon Intellectual Property Law Firm.
(Continued)

*Primary Examiner* — Jade R Chwasz
(74) *Attorney, Agent, or Firm* — Harness, Dickey & Pierce, P.L.C.

(57) ABSTRACT

A 2D/3D switching apparatus includes a switching layer that includes a cylindrical lens grating and a cavity defined by a cylindrical curved surface of the cylindrical lens grating and a cover, a container for storing a transparent liquid that has a refractive index equal to a refractive index of a material of the cylindrical lens grating, and a vacuum pump respectively connected with the cavity of the switching layer and the container. The vacuum pump injects the transparent liquid from the container to the cavity of the switching layer, or injects the transparent liquid from the cavity to the container.

13 Claims, 4 Drawing Sheets

(58) Field of Classification Search
CPC .... G02B 26/0875; G02B 3/12; G02B 26/004; G02B 3/14; H04N 13/0404; H04N 13/0409; H04N 2213/001; H04N 13/0402
USPC .......................... 359/462, 463, 464, 466, 477
See application file for complete search history.

(56) References Cited

FOREIGN PATENT DOCUMENTS

| | | | |
|---|---|---|---|
| CN | 2011-73995 | Y | 12/2008 |
| CN | 101915987 | A | 12/2010 |
| CN | 102193203 | A * | 9/2011 |
| CN | 102193203 | A | 9/2011 |
| CN | 103698890 | A | 4/2014 |
| DE | 10025226 | A1 | 11/2001 |
| EP | 2565698 | A2 | 3/2013 |
| JP | H08-68961 | A | 3/1996 |
| JP | H0868961 | A * | 3/1996 |
| JP | 2011-090054 | A | 5/2011 |

OTHER PUBLICATIONS

Written Opinion of the International Searching Authority for international application No. PCT/CN2014/076561.

* cited by examiner

2D/3D SWITCHING APPARATUS AND DISPLAY DEVICE

CROSS-REFERENCE TO RELATED APPLICATION

This application is the U.S. national phase of PCT Application No. PCT/CN2014/076561 filed on Apr. 30, 2014, which claims a priority to Chinese Patent Application No. 201310731547.4 filed on Dec. 26, 2013, the disclosures of which are incorporated in their entirety by reference herein.

TECHNICAL FIELD

The present disclosure relates to the field of display technology, in particular to a 2D/3D switching apparatus and a display device including the 2D/3D switching apparatus.

BACKGROUND

With a progress of a digital image processing technology and an equipment manufacturing level, 3D display has become a major trend in display industry. A basic principle of the current 3D display is "parallax type stereoscopic display". Specifically, a viewer is made to watch two different images using a certain equipment or a technology. That is, a left eye is made to watch only a left image, and a right eye is made to watch only a right image. The left image and the right image are images of a spatial object that are taken from two different angles. The left image and the right image are referred to as a stereoscopic image pair. Then, a human brain will combine the two images watched by the two eyes together to produce a 3D effect.

3D display according to the prior art is divided into glasses-wearing type and naked-eye type. Glasses-wearing type requires the viewer to wear 3D glasses to get 3D display effect. But the wearing of glasses adversely affects an experience feeling of the viewer, limits a freedom of the viewer, and substantially affects an experience feeling of a viewer who has myopia or hyperopia. The naked-eye type includes a parallax barrier type, a cylindrical lens grating type, a liquid crystal grating type. The prior art discloses a grating-type 2D/3D switching apparatus. The grating-type 2D/3D switching apparatus includes a deformed cylindrical lens grating and a 2D display device. The deformed cylindrical lens grating stores two kinds of immiscible transparent liquid. The two kinds of transparent liquid have different refractive indexes, and have similar or identical densities. A transparent elastic film is used to separate the two kinds of transparent liquid. Both surfaces of the elastic film have multiple transparent support plates to support the elastic film. The deformation of the elastic film is achieved and controlled by a liquid flow driven by an external force and a supporting by the support plates. The elastic film has two states including a flat shape state and a cylindrical shape state. The 2D/3D display switching is achieved by the state switching of the elastic film. In actual use, this kind of switching apparatus is highly unstable, and the structure of the switching apparatus is very complicated and is difficult to be implemented.

SUMMARY

It is an object of the embodiments of the present disclosure to provide a 2D/3D switching apparatus which has a simple structure and is easy to be implemented.

In order to solve the above-described technical problem, the present disclosure provides a 2D/3D switching apparatus. The 2D/3D switching apparatus includes:

a switching layer including a cylindrical lens grating and a cavity defined by a cylindrical curved surface of the cylindrical lens grating and a cover;

a container storing a transparent liquid, the transparent liquid having a refractive index that is equal to a refractive index of a material of the cylindrical lens grating; and a vacuum pump respectively connected with the cavity of the switching layer and the container, the vacuum pump injecting the transparent liquid from the container to the cavity of the switching layer, or injecting the transparent liquid from the cavity to the container.

Alternatively, the 2D/3D switching apparatus further includes a vacuum tank that connects the vacuum pump with the cavity of the switching layer. The vacuum tank is hermetically communicated with an air pumping hole of the vacuum pump and the cavity of the switching layer.

Alternatively, the vacuum tank includes an airflow smoothing tank, an air compressing tank, a pneumatic piston, and a sealing ring. The airflow smoothing tank is hermetically communicated with the air pumping hole of the vacuum pump, the air compressing tank is positioned adjacent to the airflow smoothing tank, intercommunication holes are arranged between the airflow smoothing tank and the air compressing tank, the vacuum tank is hermetically communicated with the cavity of the switching layer by the sealing ring, and the pneumatic piston is arranged in the air compressing tank and moves in the air compressing tank according to an air pressure in the air compressing tank.

Alternatively, the container is hermetically communicated with the cavity and is communicated with an exhaust hole of the vacuum pump.

Alternatively, the container is communicated with the exhaust hole of the vacuum pump at a side of the container and a pneumatic piston or an elastic film is arranged at an inner side of the container.

Alternatively, a first electric valve is provided at a position of the air pumping hole of the vacuum pump, a second electric valve is provided at a position of the exhaust hole of the vacuum pump, the first electric valve controls turning-on or turning-off of the air pumping hole, and the second electric valve controls turning-on or turning-off of the exhaust hole.

Alternatively, the transparent liquid has an electrical conductivity, and a first electrode and a second electrode are arranged at the inner side of the vacuum tank. The first electrode is electrically connected with the first electric valve, and the second electrode is electrically connected with the second electric valve. When the first electrode is communicated with the second electrode by the transparent liquid, the first electric valve controls the air pumping hole to turn off and the second electric valve controls the exhaust hole to turn off.

Alternatively, the cylindrical lens grating is made of a glass material, a quartz material, or a resin material, and the transparent liquid is one of an organic solvent, an organic solution, or a water solution.

Alternatively, a hydrophobic material is coated on an inner side of the cavity of the switching layer.

According to another aspect, the present disclosure provides a display device including a display panel and above-described 2D/3D switching apparatus.

The present disclosure provides a 2D/3D switching apparatus and a display device. A switching between 2D and 3D is achieved by injecting or extracting a transparent liquid to or from a switching layer, which has a cavity. The transparent liquid has a refractive index equal to a refractive index of a material of a cylindrical lens grating. Comparing with a prior art, the 2D/3D switching apparatus provided by the present disclosure has a simpler structure and is easy to be implemented.

DETAILED DESCRIPTION

The following will describe an embodiment of the present disclosure with reference to accompanying drawings. The embodiment to be described in the following is used to explain the present disclosure, but not for limiting a scope of the present disclosure.

Figure 1:
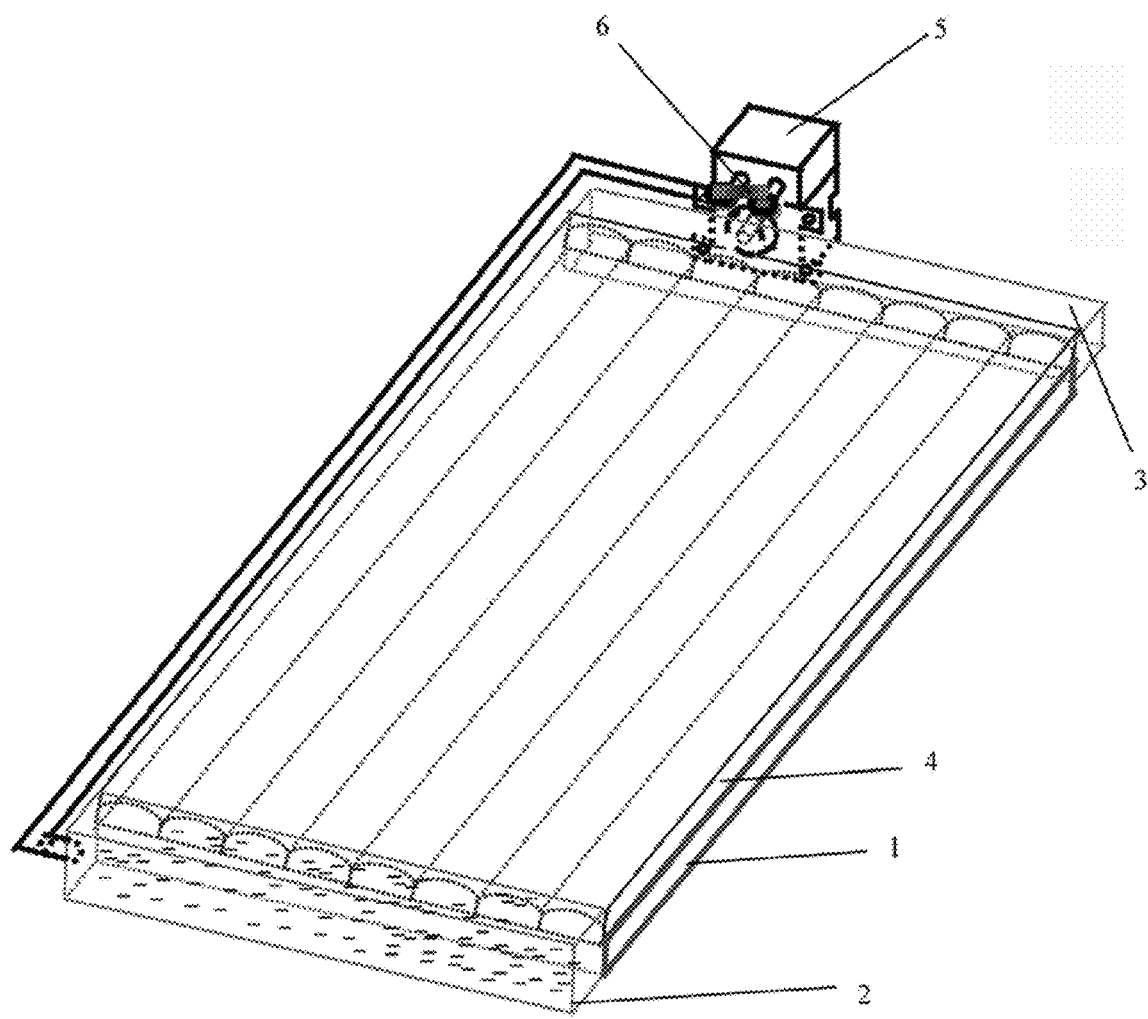
FIG. 1 is a schematic diagram showing a configuration of a 2D/3D switching apparatus according to an embodiment of the present disclosure.

FIG. 1 is a schematic diagram showing a configuration of a 2D/3D switching apparatus according to an embodiment of the present disclosure. The switching apparatus includes a switching layer 4, a container 2, and a vacuum pump 5.

Figure 2:
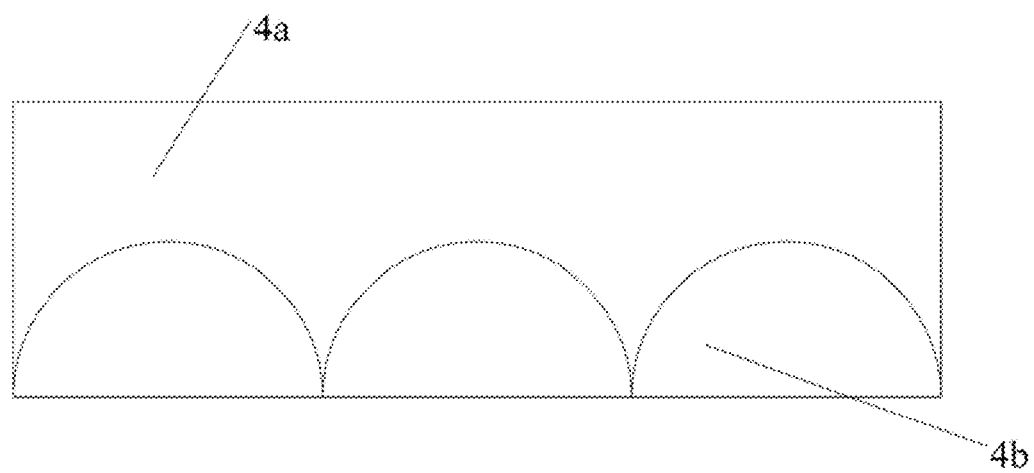
FIG. 2 is a schematic diagram showing a cross-sectional view of a switching layer according to an embodiment of the present disclosure.

As shown in FIG. 2, the switching layer 4 is positioned adjacent to a display panel 1. The switching layer 4 includes a cylindrical lens grating 4b and a cavity 4a. The cavity 4a is defined by a cylindrical curved surface of the cylindrical lens grating 4b and a cover.

The container 2 stores a transparent liquid. The transparent liquid has a refractive index that is equal to a refractive index of a material of the cylindrical lens grating 4b.

The vacuum pump 5 is respectively connected with the cavity 4a of the switching layer 4 and the container 2. The vacuum pump 5 injects the transparent liquid from the container 2 to the cavity 4a of the switching layer 4, or injects the transparent liquid from the cavity 4a to the container 2.

FIG. 2 shows a detailed structure of the switching layer 4. The switching layer 4 includes the cylindrical lens grating 4b and the cavity 4a defined by the cylindrical curved surface of the cylindrical lens grating 4b and the cover. Specifically, in the switching layer 4, the cover is arranged over the cylindrical lens grating 4b. The cover is fixed to the cylindrical lens grating 4b by an adhesive or in different manner. The cavity 4a is defined between an upper surface of the cylindrical lens grating 4b and the cover. The cover may be provided by a glass cover. The cylindrical lens grating 4b may be made of a glass material, a quartz material, or a resin material. The cylindrical lens grating 4b may also be made of other material having a characteristic similar to/identical with the glass material, the quartz material, or the resin material.

Figure 3:
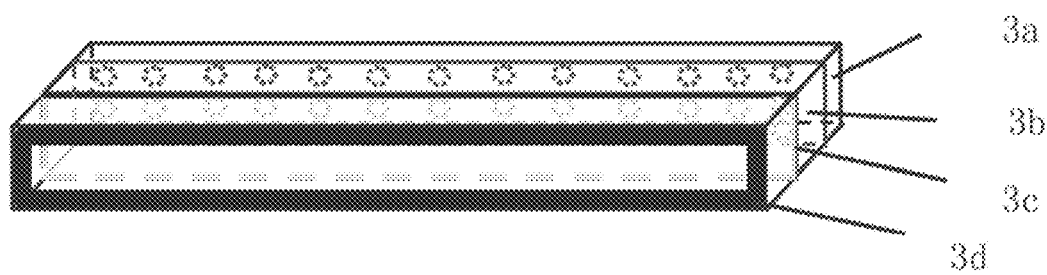
FIG. 3 is a schematic diagram showing a configuration of a vacuum tank according to an embodiment of the present disclosure.

The switching apparatus further includes a vacuum tank 3. FIG. 3 shows a detailed structure of the vacuum tank 3. The vacuum tank 3 may have any shape. In the following description, a rectangular parallelepiped shape will be described as an example. The vacuum tank 3 is hermetically connected with the cavity 4a of the switching layer 4. The vacuum tank 3 includes a first tank and a second tank. The two tanks are airflow smoothing tank 3a and air compressing tank 3b, respectively. The vacuum tank 3 further includes a pneumatic piston 3c and a sealing ring 3d.

The airflow smoothing tank 3a is hermetically communicated with an air pumping hole of the vacuum pump 5. That is, the vacuum pump 5 is connected with the cavity 4a of the switching layer 4 via the vacuum tank 3.

The air compressing tank 3b is positioned adjacent to the airflow smoothing tank 3a. The air compressing tank 3b, via the vacuum pump, controls an air pressure and achieves an extraction and a releasing of the liquid. Multiple intercommunication holes are regularly arranged between the airflow smoothing tank 3a and the air compressing tank 3b. An air pressure change in the first tank is uniformly transferred to the second tank by the intercommunication holes. According to the air pressure change in the second tank (air compressing tank 3b), the pneumatic piston 3c moves in the second tank, and extracts or releases the transparent liquid.

Figure 4:
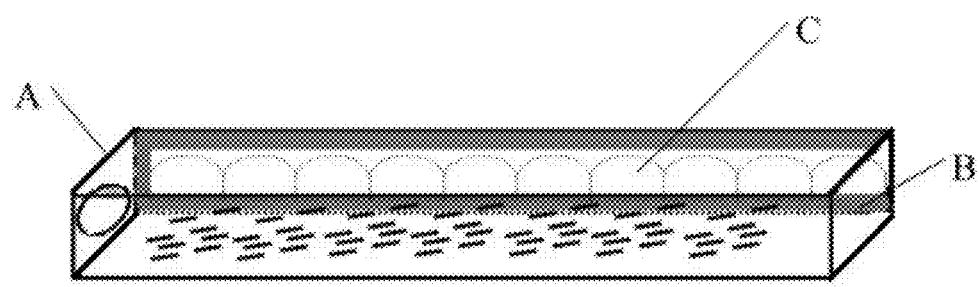
FIG. 4 is a schematic diagram showing a configuration of a container according to an embodiment of the present disclosure.

FIG. 4 shows a detailed configuration of the container 2. The container 2 stores the transparent liquid. The transparent liquid has a refractive index that is equal to a refractive index of a material of the cylindrical lens grating. Specifically, the transparent liquid may be an organic solvent, an organic solution, or a water solution, each of which has a refractive index equal to the refractive index of the cylindrical lens grating. The water solution may be a saturated salt solution.

The container is connected with the vacuum pump. Specifically, the container is connected with the exhaust hole of the vacuum pump at a surface A. A pneumatic piston or an elastic film, which are matched with the container, may be positioned at an inner side of the surface A of the container. When the vacuum pump generates an air pressure, the air pressure drives the pneumatic piston to move or make the elastic film to be deformed so that the transparent liquid in the container is injected from a surface C of the container to the cavity 4a of the switching layer 4. Alternatively, a surface B of the container may be further connected with the exhaust hole of the vacuum pump, and at the same time, a pneumatic piston or an elastic film, which are matched with the container, may be positioned at an inner side of the surface B of the container. The vacuum pump generates the air pressure on the surface A and the surface B of the container so that the transparent liquid is injected into the cavity 4a at a higher speed.

A first electric valve is provided at a position of the air pumping hole of the vacuum pump 5, and a second electric valve is provided at a position of the exhaust hole of the vacuum pump 5. The first electric valve controls turning-on or turning-off of the air pumping hole, and the second electric valve controls turning-on or turning-off of the exhaust hole.

Specifically, when the 2D display mode is required, the vacuum pump 5 is activated and the first electric valve and the second electric valve are turned on. Air extraction is carried out to the vacuum tank 3 via the air pumping hole of the vacuum pump, and the extracted air is exhausted through the exhaust hole. At this time, the vacuum tank is in a negative pressure state. Under the negative pressure state, the transparent liquid is absorbed from container 2 to the cavity 4a of the switching layer 4. When the cavity 4a is full of the transparent liquid, the vacuum pump 5 is turned off and the first electric valve and the second electric valve are turned off so that a space is hermetically defined in the vacuum tank. The transparent liquid in the cavity 4a is in a static state.

The following will describe an operation of the 2D/3D switching apparatus.

Figure 6:
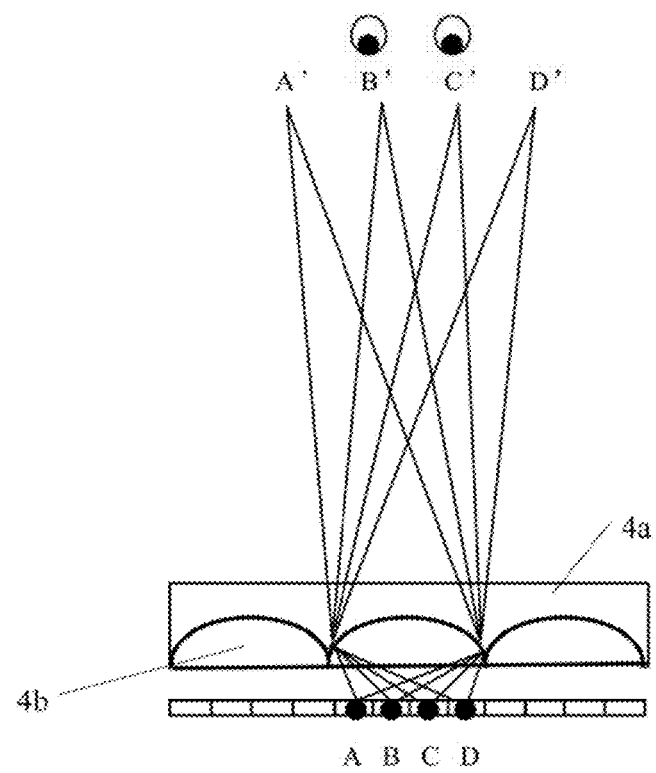
FIG. 6 is a schematic diagram showing an 2D/3D switching apparatus in a 3D display mode according to an embodiment of the present disclosure.

As shown in FIG. 6, an initial state of the display panel is set to a 3D display mode. When a display image transmits through the switching layer, since the cavity is full of air instead of the transparent liquid, under an action of the cylindrical lens grating, a light transmitting path is changed. By setting appropriate parameters, 3D display effect can be provided. Setting the appropriate parameters includes a setting of a height of the cylindrical lens grating or the like that is well known as a prior art.

Figure 7:
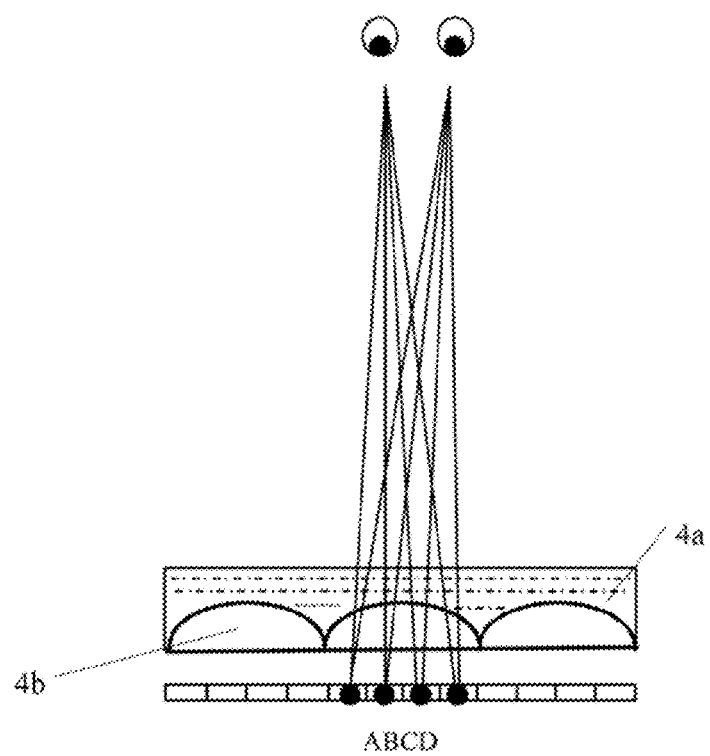
FIG. 7 is a schematic diagram showing switching apparatus in a 2D display mode according to an embodiment of the present disclosure.

As shown in FIG. 7, when the display mode needs to be switched to the 2D display mode, the vacuum pump is activated and the first electric valve and the second electric valve are turned on. The vacuum tank is in the negative pressure state, and the transparent liquid is absorbed from the container to the cavity of the switching layer. When the cavity is full of the transparent liquid, the vacuum pump is turned off and the first electric valve and the second electric valve are turned off so that a space is hermetically defined in the vacuum tank. The transparent liquid in the cavity is in the static state. Thus, 2D/3D switching apparatus can maintain the 2D display mode.

Refer to FIG. 6 again, when the display mode needs to be switched to the 3D display mode, only the first electric valve and the second electric valve need to be turned on, and the vacuum negative pressure disappears, and the transparent liquid flows back from the cavity of the switching layer to the container under an effect of gravity or an air pressure. Thus, the display panel is able to display in the 3D display mode.

Figure 5:
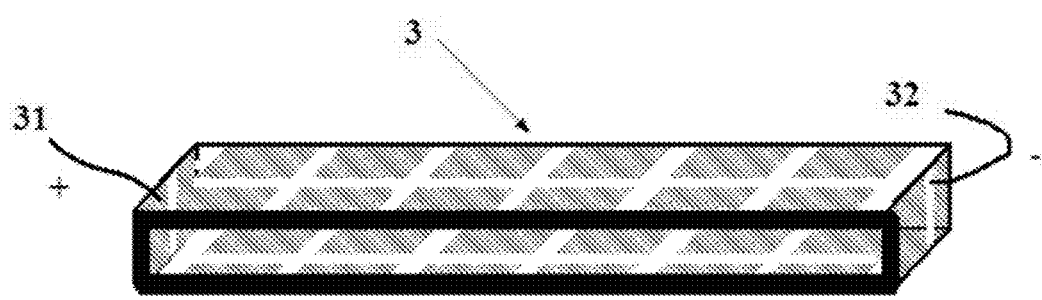
FIG. 5 is a schematic diagram showing another configuration of a vacuum tank according to an embodiment of the present disclosure.

FIG. 5 shows a different configuration example of the vacuum tank. As shown in FIG. 5, the vacuum tank 3 includes a first electrode 31 and a second electrode 32, which are positioned inside of the vacuum tank 3. The first electrode 31 may be a positive electrode and the second electrode 32 may be a negative electrode. The first electrode is connected with the first electric valve, and the second electrode is connected with the second electric valve. Since the transparent liquid has an electrical conductivity, when the first electrode and the second electrode are communicated with each other via the transparent liquid, the first electric valve and the second electric valve control the air pumping hole and the exhaust hole to turn off, respectively.

Under above-described structure of the vacuum tank, the following will describe an operation of the 2D/3D switching apparatus.

As shown in FIG. 6, an initial state of the display panel is set to the 3D display mode. When a display image transmits through the switching layer, since the cavity is full of air instead of the transparent liquid, under an action of the cylindrical lens grating, a light transmitting path is changed. By setting appropriate parameters, 3D display effect can be provided. Setting the appropriate parameters includes a setting of a height of the cylindrical lens grating or the like that is well known as a prior art. As shown in FIG. 6, in the cylindrical lens grating, a width of each cylindrical lens matches a width of a four-line pixel unit of the display panel.

Under the 3D display mode, a pixel A, a pixel B, a pixel C, and a pixel D correspond to four parallax images, respectively. Lights emitted from the four pixels, under the action of the cylindrical lens grating of the switching layer, correspond to view points A', B', C', and D', respectively. A viewer watches a parallax image (pixel C) on his/her left eye, and watches a parallax image (pixel B) on his/her right eye. A human brain may combine the two images watched by the two eyes and generate 3D effect. The parameter of each cylindrical lens of the cylindrical lens grating, such as the width, may be adjusted according to an actual design needs. For example, the width of the cylindrical lens grating may be matched with a width of two-line pixel unit of the display panel.

As shown in FIG. 7, when the display mode needs to be switched to the 2D display mode, the vacuum pump is activated and the first electric valve and the second electric valve are turned on. The vacuum tank is in the negative pressure state, and the transparent liquid is absorbed from the container to the cavity of the switching layer. When the cavity is full of the transparent liquid, the transparent liquid enters into the vacuum tank. Since the vacuum tank includes the first electrode and the second electrode at inside and the transparent liquid has the electrical conductivity, when the transparent liquid in the vacuum tank becomes to have a predetermined height, the two connected electrodes in the vacuum tank are conducted to each other. Thus, the first electric valve and the second electric valve are turned off and a space is hermetically defined in the vacuum tank. The vacuum pump communicates the air extracted from the vacuum tank with the container via a pipe. Under an effect of air pressure at two ends of the container, the pneumatic piston is pushed in or the elastic film positioned adjacent to the connection opening is deformed to maintain an air pressure balance. The transparent liquid in the cavity is in the static state so that the 2D/3D switching apparatus maintains in the 2D display mode. Under the 2D display mode, the eyes of the view can watch the whole image on the display panel (that is, the pixel A, the pixel B, the pixel C, and the pixel D). Thus, at this time, the image watched by the viewer is sensed as a 2D image.

Refer to FIG. 6 again, when the display mode needs to be switched to the 3D display mode again, only the first electric valve and the second electric valve need to be turned on, and the vacuum negative pressure disappears, and the transparent liquid flows back from the cavity of the switching layer to the container under an effect of gravity or an air pressure. Thus, the display panel is able to display in the 3D display mode.

Further, a hydrophobic material may be coated on an inner side of the cavity of the switching layer. With this hydrophobic material, except the negative pressure attraction, the transparent liquid can be prevented from entering the cavity under an effect of syphonage.

The embodiment of the present disclosure provides a 2D/3D switching apparatus, which includes a cylindrical lens grating and a cavity defined by a cylindrical curved surface of the cylindrical lens grating and a cover. A switching between 2D and 3D is achieved by injecting or extracting a transparent liquid to or from a switching layer, which has a cavity. The transparent liquid has a refractive index equal to a refractive index of a material of a cylindrical lens grating. Comparing with a prior art, the 2D/3D switching apparatus provided by the present disclosure has a simpler structure and is easy to be implemented, and further, is easy to achieve an enlarging in size. The present disclosure does not require a complicated system or a highlyspecified solution, such as deformed cylindrical lens grating, solution type electrochromic material, or a field driving. Thus, a cost of the apparatus can be reduced. Further, when the container and the vacuum tank are respectively positioned in a vertical direction of the display panel, injecting or extracting of the transparent liquid is achieved by the piston or under the effect of the gravity of the transparent liquid. Thus, external driving force is not necessary, and energy saving can be achieved.

In the foregoing embodiment, the vacuum pump is used to inject the transparent liquid from the container to the cavity of the switching layer, or is used to inject the transparent liquid from the cavity to the container. The injection mechanism is not only limited to the vacuum pump. Other mechanism having similar operations can be used instead of the vacuum pump.

The embodiment of the present disclosure further provides a display device, which includes a display panel and the 2D/3D switching apparatus according to any one of above-described aspects. The display device may be a device or a product having a display function, such as a liquid crystal panel, an electronic paper, an OLED panel, a mobile phone, a tablet computer, a television, a monitor, a laptop computer, a digital album, a navigation device or the like.

Above-described embodiment is used for explaining the present disclosure, but not used for limiting the present disclosure. Obviously, those skilled in the art can change and modify present disclosure in various ways without departing from a spirit and a scope of the present disclosure. Thus, when the change and modification of the present disclosure belong to a scope of the claims of the present disclosure and their equivalents, the present disclosure also intends to include these changes and modifications. A protection scope of the present disclosure is defined by claims of the present disclosure.

What is claimed is:

1. A two-dimensional/three-dimensional (2D/3D) switching apparatus comprising:
   a switching layer comprising a cylindrical lens grating and a cavity defined by a cylindrical curved surface of the cylindrical lens grating and a cover;
   a container storing a transparent liquid, the transparent liquid having a refractive index that is equal to a refractive index of a material of the cylindrical lens grating;
   a vacuum pump respectively connected with the cavity of the switching layer and the container, the vacuum pump injecting the transparent liquid from the container to the cavity of the switching layer, or injecting the transparent liquid from the cavity to the container; and
   a vacuum tank that connects the vacuum pump with the cavity of the switching layer;
   wherein a first part of the vacuum tank is hermetically communicated with an air pumping hole of the vacuum pump, and a second part of the vacuum tank is hermetically communicated with the cavity of the switching layer, the first part and the second part of the vacuum tank are isolated from each other, the first part of the vacuum tank is isolated from the cavity of the switching layer, and the vacuum pump is isolated from the cavity of the switching layer;
   an elastic film is arranged at an inner side of a portion of the container, an exhaust hole of the vacuum pump is connected with the portion of the container, and the exhaust hole of the vacuum pump is isolated from the transparent liquid in the container by the elastic film.

2. The 2D/3D switching apparatus according to claim 1, wherein
   the vacuum tank comprises an airflow smoothing tank, an air compressing tank, a pneumatic piston, and a sealing ring,
   the airflow smoothing tank is hermetically communicated with the air pumping hole of the vacuum pump,
   the air compressing tank is positioned adjacent to the airflow smoothing tank,
   intercommunication holes are arranged between the airflow smoothing tank and the air compressing tank,
   the vacuum tank is hermetically communicated with the cavity of the switching layer by the sealing ring, and
   the pneumatic piston is arranged in the air compressing tank and moves in the air compressing tank according to an air pressure in the air compressing tank.

3. The 2D/3D switching apparatus according to claim 2, wherein
   the cylindrical lens grating is made of a glass material, a quartz material, or a resin material, and
   the transparent liquid is one of an organic solvent, an organic solution, or a water solution.

4. The 2D/3D switching apparatus according to claim 1, wherein
   the container is hermetically communicated with the cavity.

5. The 2D/3D switching apparatus according to claim 4, wherein
   a first electric valve is provided at a position of the air pumping hole of the vacuum pump,
   a second electric valve is provided at a position of the exhaust hole of the vacuum pump,
   the first electric valve controls turning-on or turning-off of the air pumping hole, and
   the second electric valve controls turning-on or turning-off of the exhaust hole.

6. The 2D/3D switching apparatus according to claim 5, wherein
   the transparent liquid has an electrical conductivity,
   a first electrode and a second electrode are arranged at the inner side of the vacuum tank,
   the first electrode is electrically connected with the first electric valve,
   the second electrode is electrically connected with the second electric valve, and
   when the first electrode is communicated with the second electrode by the transparent liquid, the first electric valve controls the air pumping hole to turn off and the second electric valve controls the exhaust hole to turn off.

7. The 2D/3D switching apparatus according to claim 5, wherein
   the cylindrical lens grating is made of a glass material, a quartz material, or a resin material, and
   the transparent liquid is one of an organic solvent, an organic solution, or a water solution.

8. The 2D/3D switching apparatus according to claim 4, wherein
   the cylindrical lens grating is made of a glass material, a quartz material, or a resin material, and
   the transparent liquid is one of an organic solvent, an organic solution, or a water solution.

9. The 2D/3D switching apparatus according to claim 1, wherein
   the cylindrical lens grating is made of a glass material, a quartz material, or a resin material, and the transparent liquid is one of an organic solvent, an organic solution, or a water solution.

10. The 2D/3D switching apparatus according to claim 9, wherein
a hydrophobic material is coated on an inner side of the cavity of the switching layer.

11. A display device comprising:
a display panel; and
the 2D/3D switching apparatus according to claim 1.

12. The display device according to claim 10, wherein
the cylindrical lens grating is made of a glass material, a quartz material, or a resin material, and
the transparent liquid is one of an organic solvent, an organic solution, or a water solution.

13. The 2D/3D switching apparatus according to claim 1, wherein the container and the vacuum tank are at opposite sides of the switching layer.

\* \* \* \* \*